United States Patent

[11] 3,618,651

| [72] | Inventors | Marcus R. Hart<br>Concord;<br>Robert P. Graham, El Cerrito; Charles C. Huxsoll, San Pablo; Gerald S. Williams, Berkeley, all of Calif. |
|---|---|---|
| [21] | Appl. No. | 873,220 |
| [22] | Filed | Nov. 3, 1969 |
| [45] | Patented | Nov. 9, 1971 |
| [73] | Assignee | The United States of America as represented by the Secretary of Agriculture |

[54] SYSTEM FOR PEELING FRUITS AND VEGETABLES
3 Claims, 5 Drawing Figs.

[52] U.S. Cl. .................................................. 146/226, 146/49 R, 146/231, 146/235
[51] Int. Cl. .................................................. A23n 7/00
[50] Field of Search .......................................... 146/49 A, 49 R, 231, 226, 235

[56] References Cited
UNITED STATES PATENTS

| 3,517,715 | 6/1970 | Graham et al. ........... | 146/231 |
| 3,024,821 | 3/1962 | Bean ....................... | 146/49 R |
| 3,460,162 | 8/1969 | Sijbring .................... | 146/231 X |
| 3,480,057 | 11/1969 | Wilhelm .................. | 146/231 |

*Primary Examiner*—Willie G. Abercrombie
*Attorneys*—R. Hoffman, W. Bier and W. Takacs ABSTRACT: Fruits or vegetables are treated (e.g., with lye) to loosen the peel, and the loosened peel is removed by nonabrasive dry wiping with rotating discs of soft flexible rubber.

PATENTED NOV 9 1971 3,618,651

M. R. HART, R. P. GRAHAM,
C. C. HUXSOLL, & G. S. WILLIAMS
INVENTORS

BY Hoffman & W Takacs
ATTORNEYS

M.R. HART, R.P. GRAHAM,
C.C. HUXSOLL, & G.S. WILLIAMS.
INVENTORS

BY R. Hoffman & W. Takacs
ATTORNEYS

SYSTEM FOR PEELING FRUITS AND VEGETABLES

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel method and apparatus for peeling fruits and vegetables. More particularly, the invention provides peeling systems which not only give efficient peeling results but also which ameliorate the waste disposal and pollution problems encountered in conventional peeling practice. Further objects and advantages of the invention will be evident from the following description wherein parts and percentages are by weight unless otherwise specified.

In the following description emphasis is directed to the treatment of peaches. This is by way of example, not limitation. Similar problems are encountered with other produce, and in its broad ambit the invention is applicable to fruits and vegetables in general—for example, apricots, nectarines, plums, apples, pears, tomatoes, potatoes, sweet potatoes, etc.

In conventional practice in canneries, peaches are peeled by the following procedure The fruit (whole or halved and pitted) is carried on a conveyor belt through a device which cascades hot lye solution over the fruit. The lye causes a softening or loosening of the peel but does not actually remove it. Accordingly, the lye-treated fruit is conveyed through another zone in which strong jets of water are directed against the fruit, whereby the lye-loosened peel is flushed off the fruit. Although this procedure provides effective peeling, it has the disadvantage that it produces a large volume of waste liquor containing all the water used in the peeling step and the removed peel material. The disposal of this waste liquor presents a serious problem. If discharged directly into a stream it causes pollution of the water course. Moreover, biological destruction by ponding or the like is slow and inefficient, particularly because of the high alkalinity of the liquor. Of course, the liquor could be neutralized but this would involve additional expense for acid and for equipment for metering the acid and maintaining a predetermined pH. Because of the present emphasis by federal, state, and local governments on pollution control, food processors who rely on the procedure in question are facing a crisis—they must devise a disposal system which not only meets antipollution standards, but also does the job economically so that they can stay in business. A failure to meet these criteria means that the operations must be shut down.

A primary object of the invention is the provision of peeling methods which obviate the problems outlined above. A particular feature of the invention is the elimination of the conventional step of removing the lye-loosened peel with water. Instead, a procedure is employed which permits removal of the peel in a dry manner. As a consequence the process of the invention does not yield a dilute waste liquor, that is, a large volume of water containing the peel material. Instead, it yields a concentrated waste, generally of a solid to semisolid nature, which is composed essentially of peel material. Since this waste is in such a concentrated condition it is small in weight and volume as compared to conventional peeling waste liquors and hence its disposal presents no difficulty. For example, the waste can be effectively and economically disposed of by burning it, directly or after a minor degree of dehydration. Burning of the waste not only avoids pollution problems, but also yields thermal energy which can be utilized in various ways in the plant. Moreover, the remaining ash can be treated to extract sodium carbonate therefrom. (The NaOH in the waste is converted into the carbonate during combustion.)

In addition to obviating the problem of waste disposal, the process of the invention provides effective peeling so that the peeled produce is adapted for all conventional uses as in preparing dehydrated, frozen, canned, and other types of preserved products. The peeling losses are no higher than with conventional techniques—for example, 4 to 5 percent in the case of peaches. The manner in which the principles outlined above are applied in a practice of the invention is next described in detail, having reference to the annexed drawing, wherein.

Figure 5:
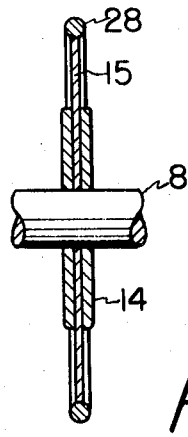

FIG. 5 is a fragmentary section of a modified form of the peeling disc. Directing attention to FIG. 1, reference numeral 1 designates the peeling unit of the invention. It is mounted in a sloping position above base 2 by means of hinge 3 and strut 4. By varying the length of strut 4 (through inserting bolt 5 in a selected position) the slope of unit 1 may be varied. Usually, unit 1 is maintained at an angle of about 30°–45° from the horizontal.

Peeling unit 1 includes a pair of sidewalls 6,7 which support a series of shafts 8 keyed to pulleys 9. For rotation of shafts 8 there is provided electric motor 10. This motor, through belts 11 and 12, rotates shafts 8, all in the same direction as indicated by the arrows. Idlers 13 are provided to ensure engagement of belt 12 with pulleys 9.

Mounted on and rotating with each shaft 8 are several pairs of supporting plates 14. Discs 15 of thin, rubbery material are clamped between each pair of plates 14.

Figure 3:
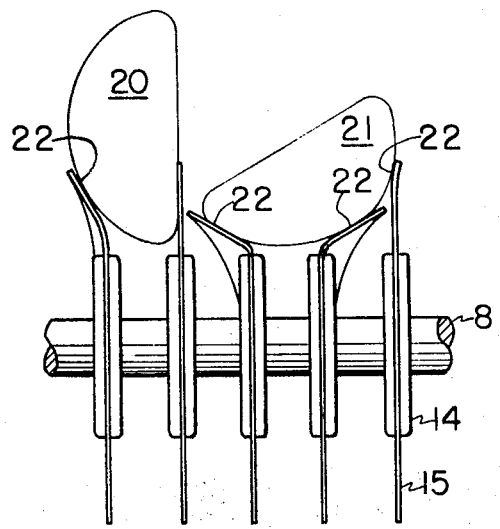
FIG. 3 is a fragmentary view on an enlarged scale depicting the action of the peeling discs.

Plates 14 preferably have rounded shoulders—as shown in FIG. 3—so that they will not exert a cutting action on the fruit being peeled.

Figure 1:
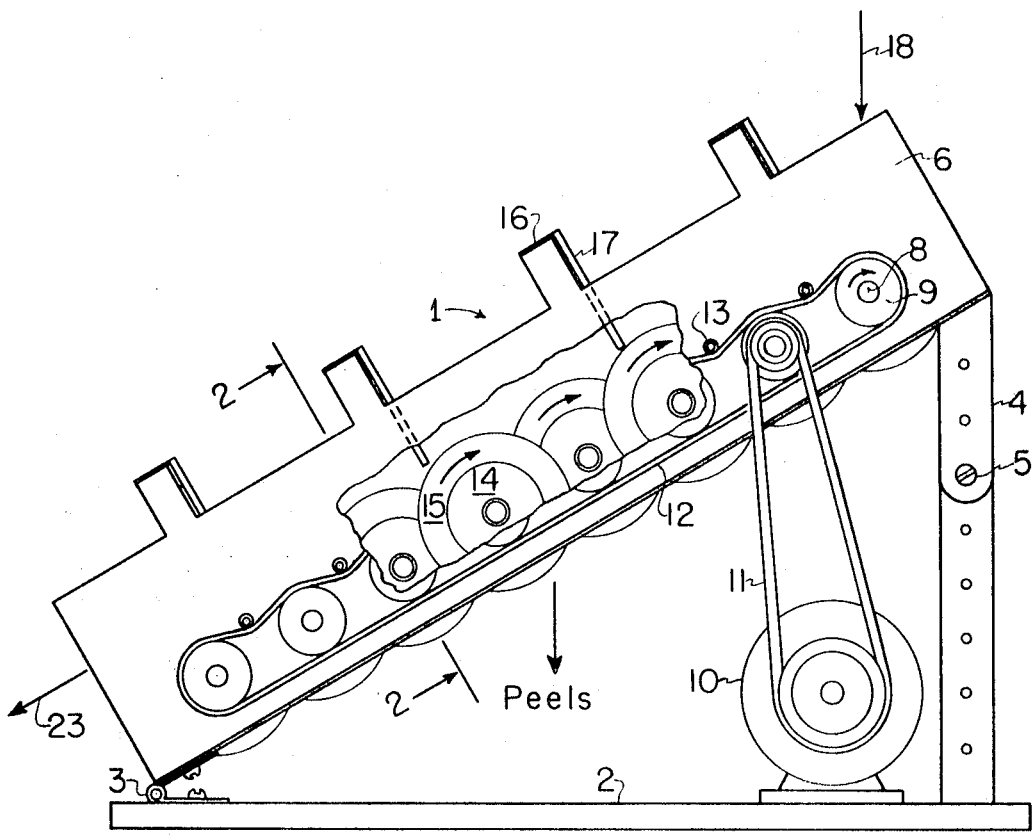
FIG. 1 is a side view of the peeling unit of the invention.
Figure 2:
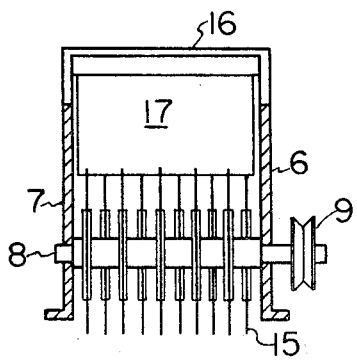
FIG. 2 is a cross-sectional view taken on plane 2—2 of FIG. 1.

As evident in FIGS. 1 and 2, discs 15 on adjacent shafts are arranged in staggered fashion so that the discs on one shaft extend between the discs on the adjacent shafts. Thus on the whole, discs 15 present an interleaved pattern.

It is desired that discs 15 have the property of flexing readily as they wipe across the surfaces of the product being peeled. For this reason the discs should have a thickness of about one-thirtysecond inch and be made of rubber (natural or synthetic) which is soft and flexible. Typically, we have attained good results with the use of rubbers having a rating of 40 to 60 as measured on the Shore A hardness durometer. Moreover, since the desired action is one of wiping in contrast to abrasion, the stock from which discs 15 are fabricated should have a smooth surface. It should be free from abrasive grains or other scratchy particles which would mar the flesh of the product under treatment.

In fabricating a peeling unit in accordance with the invention, due regard must be given to the size of the product to be peeled. Thus, the spacing between discs 15 should be so selected that the products are able to penetrate into the interstices between adjacent discs but not actually fall through the device.

Mounted above sidewalls 6,7 are a series of bridging elements 16, with each of which is associated an apron 17 of flexible material such as rubber or fabric. These aprons hang freely, each being solely connected at its top to the corresponding bridge 16. In operation of the device, aprons 17 serve as retarders to prevent fruit pieces from riding on the tops of discs 15; they force the fruit into a path through the discs rather than over them.

Operation of the peeling unit: Fruit (which has been previously treated as by application of lye to soften and loosen the peel) is fed into the upper end of unit 1 as indicated by arrow 18. The fruit moves downwardly by the action of gravity within unit 1 and in doing so the peel is removed by the wiping action of rotating discs 15. Reference is made to FIG. 3 which illustrates the peeling action. The weight of fruit units 20 and 21 causes the discs 15 to flex or distort, forming areas of contact 22 between the disc surface and the fruit surface. Since the discs are moving at different (usually faster) speed than the fruit units, a wiping action takes place in these areas of contact, resulting in a removal of the peel without damage to the fruit flesh. Of course, as the fruit units 20 and 21 progress through unit 1 they are contacted in different areas by the successive banks of discs with the end result that all surfaces are eventually wiped free of peel.

The peeled fruit is discharged from the lower end of unit 1 as indicated by arrow 23. The peel detached from the fruit falls through unit 1 and may be received in a suitable pan or trough.

Figure 4:
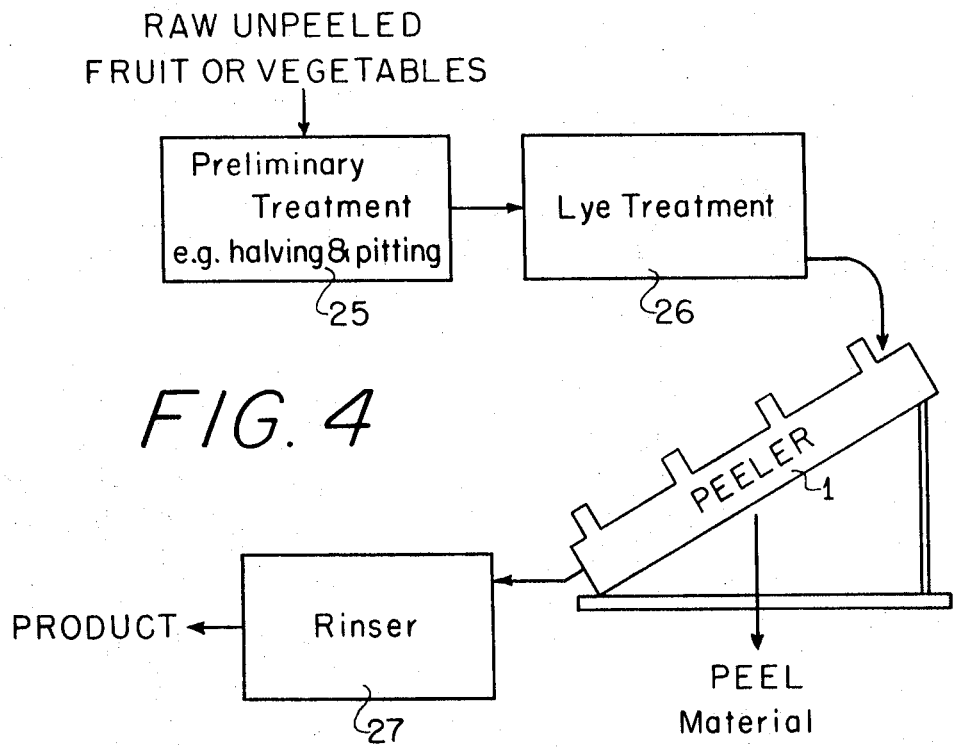
FIG. 4 is a schematic diagram or flow sheet of a processing line including the peeling unit.

Reference is now made to FIG. 4 which illustrates how peeling unit 1 is integrated into a processing system.

Raw unpeeled fruit or vegetables are fed into apparatus 10 represented by block 25 where selected operations may be performed as, for example, washing, halving, removal of pits, or the like. Where such operations are not desired, this step in the overall process is, of course, omitted.

In virtually all cases it is necessary to apply a treatment to loosen or soften the peel so that it can subsequently be readily removed by unit 1. A preferred technique to attain this peel-loosening effect involves applying aqueous lye (NaOH) to the products to be peeled. Block 26 represents the apparatus where this step is carried out. Typically, this apparatus may comprise an endless mesh belt which carries the products under a device which applies a flow of aqueous lye to them. Generally, the lye solution is hot—about 150° to 212° F.—so it will act rapidly on the peel material. The concentration of NaOH in the solution will vary, depending on the product under treatment. With fruits such as apricots and peaches the solution may be relatively dilute, i.e., about 3 to 5 percent NaOH: with white or sweet potatoes a stronger solution is needed, i.e., about 15–30 percent NaOH. The appropriate concentration of lye to use in any particular case can be determined by pilot trials or by consulting the literature; no novelty in this step per se is asserted herein. In some cases– tomatoes for instance-the peel can be loosened simply by applying steam or boiling water. With products which have tough peels–for example, apples, pears, potatoes, etc.–one may apply steam treatment in conjunction with lye treatment. Thus, for example, the products may first be exposed to jets of steam and then sprayed or flooded with lye solution. Moreover, to attain a thorough loosening of the peel one may apply various after-treatments. For example, with vegetables such as potatoes after application of the lye solution the products may be subjected to heating applied by such techniques as exposure to jets of steam, to jets of hot air, or by irradiation with infrared lamps, gas-fired radiant heaters, or like.

In any event, after the fruit or vegetables have been treated so that their peels have been loosened and softened, the products are fed into unit 1 where the peel is actually removed.

The peel products issuing from peeler 1 may retain a very minor proportion of peel, usually not more than 5–10 percent. To remove this risidual material the products are passed through a rinser 27 wherein they are subjected to sprays of water. The products leaving rinser 27 are now in completely peeled condition and ready for application of a desired treatment such as canning, freezing, or dehydration.

It is to be observed that rinser 27 involves removal of but a small proportion of the peel; accordingly, it requires only a small proportion of water—for example, about 10–15 percent the weight of the fruit or vegetables. Moreover, this limited application of water does not belie the fact that the real bulk of the peel had been previously removed in a dry manner so that the bulk of the peel is collected in a concentrated form, hence easily disposable in contrast to the usual system wherein the removed peel is received in dilute from admixed with the large amount of water used in the peel removal step.

EXAMPLE

The invention is further demonstrated by the following illustrative example.

The peeling unit was as described hereinabove. Discs 15 had a diameter of 4½ inches and there were 16 banks of them, each bank having 5 discs separated from one another by about three-fourths inches. The discs were one thirty-second inch thick, fabricated from Neoprene rubber, 50 durometer hardness. The peeling unit was positioned at 45° from the horizontal; speed of rotation of the discs was 60 r.p.m.

Cling peaches were halved and pitted, then placed cups down on a mesh belt and carried under a spout which cascaded 3 percent aqueous lye solution over them. The lye solution was at about 212° F. and applied to the peaches for about 5 to 10 seconds. The lye-treated peaches were then drained on the belt for 5–10 seconds.

After draining, the peaches were fed into the peeler unit as described above. Sojourn time was about 25 seconds.

The peaches leaving the peeling unit were observed to have been successfully peeled. The surface of the fruit was clean and smooth. At most, 5 percent of the peel remained.

The peaches were then exposed to sprays of water, using a weight of water about 10 percent that of the fruit. This removed all bits of remaining peel.

Reference is now made to FIG. 5 which illustrates a modified form of peeling discs 15. In this case, these discs are provided with a bead 28 of the same type of rubber as the disc itself, and which typically has a diameter of about twice the thickness of the disc. Bead 28 may be molded as an integral part of disc 15, or may be formed by cementing an O-ring about the periphery of a flat disc. Bead 28 has the desirable effect of preventing discs 15 from exerting any sawing effect on the products being peeled. This modification of the invention is preferred for use when the products being peeled have especially soft flesh, ripe pears for example.

We claim:

1. Apparatus for peeling fruits and vegetables which comprises, in combination
   a. a pair of sidewalls,
   a plurality of shafts mounted transversely across said walls,
   c. means for rotating said shafts,
   d. each of said shafts carrying a plurality of discs,
   e. each disc being of nonabrasive rubbery material, thin and soft enough to flex under the weight of an object applied thereto for peeling, whereby sidewalls of the discs come into contact with the object and exert a wiping action thereto.

2. Apparatus for peeling fruits and vegetables, which comprises, in combination
   a. a pair of sidewalls,
   b. a plurality of rotatable shafts mounted transversely across said walls,
   c. means for rotating said shafts,
   d. each of said shafts carrying a bank of spaced discs, the discs of one bank being staggered with respect to discs of adjacent banks to provide an assembly of interleaved discs,
   e. each disc of nonabrasive rubbery material, thin and soft enough to flex under the weight of a fruit and vegetable applied thereto for peeling.

3. A process for peeling a product selected from the group consisting of fruits and vegetables, which comprises
   a. treating the product to loosen the peel,
   b. applying the treated product to a plurality of rotating discs, the discs being thin and soft enough to yield under the weight of the product,
   c. contacting the sidewalls of the discs with the product to exert a wiping action thereon, and
   d. continuing the said contacting until the loosened peel is removed from the product by said wiping action.

* * * * *